(No Model.)
J. H. TUCKER.
WASHING RAW SUGAR AND APPARATUS THEREFOR.
No. 297,095. Patented Apr. 15, 1884.
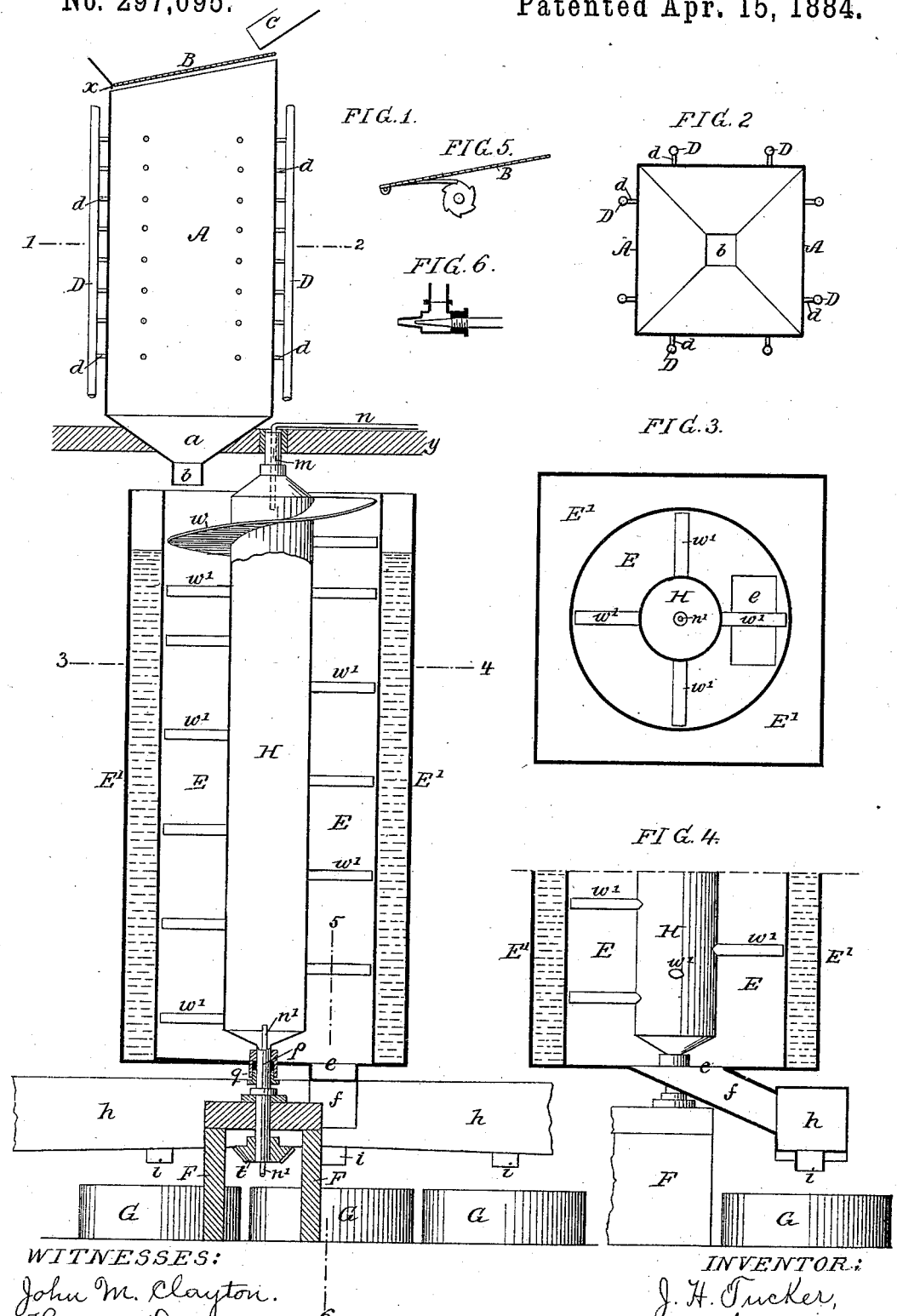

UNITED STATES PATENT OFFICE.

JOHN H. TUCKER, OF PHILADELPHIA, PENNSYLVANIA.

WASHING RAW SUGAR AND APPARATUS THEREFOR.

SPECIFICATION forming part of Letters Patent No. 297,095, dated April 15, 1884.

Application filed November 21, 1883. (No model.)

*To all whom it may concern:*

Be it known that I, JOHN H. TUCKER, a citizen of the United States, residing in Philadelphia, Pennsylvania, have invented certain Improvements in Washing Raw Sugar and in Apparatus Therefor, of which the following is a specification.

My invention relates to that branch of the process of refining sugar which is commonly termed the "machining or washing of raw sugar," and which consists in mixing the raw sugar with sufficient water or sirup to form a semi-fluid mass or magma, and subsequently submitting this mass to the action of centrifugal machines, whereby the fluid matter, in whole or in part, is separated from the crystals of cane-sugar, the object being to separate the impure sirup from the crystals of raw sugar, and thus at the outset to materially aid the refining process.

The main objects of my improvements, which are fully described hereinafter, are, first, to obtain a more perfect separation of the sugar crystals from the sirup which naturally adheres to them, and thus increase the yield of purified product by lessening the dissolving effect of the water or sirup used on the said crystals; second, to economize time and expense by rendering the purging operation more rapid and easy.

In carrying out my invention, I prefer to use the apparatus which I will now proceed to describe, reference being had to the accompanying drawings, in which—

Figure 1 is a vertical section of the apparatus; Fig. 2, a sectional plan on the line 1 2; Fig. 3, a sectional plan on the line 3 4; Fig. 4, a section of part of Fig. 1 on the line 5 6, and Figs. 5 and 6, detached parts of the apparatus.

A is a mixing-vessel, preferably square in section, as shown in Fig. 2, and having a tapering base, $a$, terminating in the central outlet, $b$. At the top of the mixer, and pivoted thereto at $x$, is a coarse inclined screen, B, which is combined with any suitable agitating mechanism—that shown in Fig. 5, for instance. All four sides of the mixer are perforated to admit the ends of the small branches $d$ of the vertical pipes D.

The heater, into which the contents of the mixing-vessel A are discharged, consists of a tank, E, preferably of cylindrical form, and surrounded by a jacket, E', which in the present instance is square, the space between the jacket and tank containing water, which should be maintained at or near the boiling-point; or, if desired, the jacket may be steam-tight for the circulation through it of steam.

The tank E is closed at the bottom with the exception of an outlet, $e$, which communicates through a spout, $f$, with a receptacle, $h$, having discharge-pipes $i$—one above each of the centrifugal machines G—the said discharge-pipes being furnished, as usual, with gates or valves.

Situated centrally within the tank E is a cylinder, H, having at the top a tubular journal, $m$, adapted to a suitable bearing, which, in the present instance, is in the floor $y$, a steam-pipe, $n$, passing through a suitable stuffing-box in this journal and into the cylinder, at the lower end of which is a tubular shaft, $p$, passing through a stuffing-box, $q$, in the bottom of the tank E, and having its bearing in any suitable stand, F, on the floor, on which are the centrifugal machines G. An outlet-pipe, $n'$, passes through the tubular shaft $p$, for the escape of steam and water of condensation. The tubular shaft $p$ is driven by any suitable system of gearing. The raw sugar is discharged through a spout, $c$, onto the agitated screen B, by which the larger lumps of sugar, together with chips of wood, pieces of cane, or other foreign matters, fall from the said screen, through which passes the fine sugar into the mixer A. The lumpy portions of sugar are now separated from the foreign matters, passed through rollers or otherwise suitably crushed, and again brought upon the screen. This preliminary proceeding contributes to the successful subsequent treatment of the sugar.

The next branch of the process is the intimate mixing of the sugar with water or sirup in the vessel A. This is effected by the discharge, into the descending shower of sugar from the screen B, of water or sirup conveyed through the pipes D and branches $d$ in the form of minute jets or fine spray, thus making a very perfect and uniform mixture before it passes into the annular space E to be heated.

The fine spray of water or sirup is produced by the action of high-pressure steam or compressed air, and is applied at the points where the branches $d$ discharge, a contrivance similar to the atomizer, or like the injector shown in Fig. 6, or any other available device being used to produce this fine spray in the mixer. The sugar on leaving the outlet $b$ of the vessel A falls into the tank E, the spiral vane $w$ of the revolving cylinder H having a tendency to force the mass downward. Within the tank E the mass is thoroughly agitated by the arms $w'$, and all parts of it thereby brought into intimate contact with the heated side of the tank and the heated surface of the cylinder H, thereby increasing the fluidity of the magma of sugar and sirup, and reducing it to the best condition for being subjected to the purging action of the centrifugal machine.

It may here be stated that it is necessary to add much less water or sirup to the raw sugar in the case of a hot magma than with a cold one to produce the same degree of fluidity for purging in the centrifugal machines, and as a consequence less of the crystallized sugar is dissolved, even allowing for the increased solvent action of hot water over cold, whereby a larger yield of the purified sugar crystals is obtained, while the sirup running off has a greater density, which is a decided advantage.

It has been found by experiment that a magma containing seven and a half per cent. of water at 150° Fahrenheit has the same fluidity as one at 60° Fahrenheit with thirteen to fourteen per cent. of water. The whole operation, moreover, will be conducted in a shorter time. I prefer to maintain the magma at a temperature of from 120° to 160° Fahrenheit, as it leaves the heater.

I am aware that in washing sugar the latter, with water or other suitable liquid, is passed through rolls, thence into a series of stirring, incorporating, and delivering machines, the thoroughly mingled and incorporated mass being finally discharged into a centrifugal machine, and this I do not claim, as it is not of my invention; but

I claim as my invention—

1. The mode herein described of mixing raw sugar with water or sirup, the said mode consisting of forcing fine sprays of said water or sirup against and into a falling shower of finely-divided raw sugar, substantially as set forth.

2. The process herein described of first obtaining a heated magma of raw sugar and water or raw sugar and sirup, and then subjecting it to the action of a centrifugal machine.

3. The process herein described of treating raw sugar, the said process consisting of the following branches—namely, first, sifting the sugar so as to remove therefrom chips and other foreign matters; second, mixing with the sugar water or sirup; third, heating and agitating the magma of sugar and water or sugar and sirup; and, fourth, subjecting it to the action of a centrifugal machine, substantially as set forth.

4. The combination of a mixing-vessel, A, having numerous lateral openings, with devices for injecting fine spray through the said openings, substantially as set forth.

5. The combination of the mixing-vessel A with the agitated screen B, substantially as described.

6. The combination of the steam or water heated tank E with the steam or water heated rotating cylinder H and its stirring-arms $w'$.

In testimony whereof I have signed my name to this specification in the presence of two subscribing witnesses.

JOHN H. TUCKER.

Witnesses:
JOHN M. CLAYTON,
HENRY HOWSON, Jr.